(12) United States Patent
Ikenishi et al.

(10) Patent No.: US 7,972,662 B2
(45) Date of Patent: Jul. 5, 2011

(54) SUBSTRATE FOR INFORMATION RECORDING MEDIUM, INFORMATION RECORDING MEDIUM AND PROCESS FOR PRODUCING INFORMATION RECORDING MEDIUM

(75) Inventors: Mikio Ikenishi, Tokyo (JP); Xuelu Zou, Tokyo (JP); Kenji Yamanaka, Tokyo (JP); Junichi Horikawa, Kofu (JP)

(73) Assignee: Hoya Corporation, Tokyo (JP)

( * ) Notice: Subject to any disclaimer, the term of this patent is extended or adjusted under 35 U.S.C. 154(b) by 239 days.

(21) Appl. No.: 11/711,669

(22) Filed: Feb. 28, 2007

(65) Prior Publication Data

US 2007/0160877 A1 Jul. 12, 2007

Related U.S. Application Data

(62) Division of application No. 10/437,430, filed on May 14, 2003, now Pat. No. 7,208,238.

(30) Foreign Application Priority Data

Jan. 31, 2003 (JP) .................................. 2003-23033
Feb. 21, 2003 (JP) .................................. 2003-43613

(51) Int. Cl.
*C23C 14/00* (2006.01)
*C23C 14/32* (2006.01)
*B05D 3/00* (2006.01)
*C08J 7/18* (2006.01)
*G21H 5/00* (2006.01)
*B32B 17/06* (2006.01)

(52) U.S. Cl. ...................... 427/553; 428/426; 204/192.1

(58) Field of Classification Search .................. 427/553; 204/192, 192.1; 428/426
See application file for complete search history.

(56) References Cited

U.S. PATENT DOCUMENTS

| | | | |
|---|---|---|---|
| 5,008,176 A | 4/1991 | Kondo et al. | |
| 6,132,843 A | 10/2000 | Kuroda et al. | |
| 6,251,232 B1 * | 6/2001 | Aruga et al. | 204/192.32 |
| 6,387,509 B1 * | 5/2002 | Goto et al. | 428/426 |
| 6,627,565 B1 | 9/2003 | Zou et al. | |
| 2001/0010870 A1 * | 8/2001 | Song et al. | 428/694 TS |
| 2003/0109370 A1 | 6/2003 | Ikenishi et al. | |

FOREIGN PATENT DOCUMENTS

| | | |
|---|---|---|
| JP | 8-104528 | 4/1996 |
| JP | 08-273194 | * 10/1996 |
| JP | 8-321034 | 12/1996 |
| JP | 9-7154 | 1/1997 |
| JP | 10-81542 | 3/1998 |
| JP | 119042 | 4/2000 |
| JP | 2001-043530 A | 2/2001 |
| JP | 2001-76336 | 3/2001 |
| JP | 2001-189008 | 7/2001 |
| JP | 180969 A | 7/2001 |
| JP | 2002-358626 | 12/2002 |

OTHER PUBLICATIONS

Machine Translation of JP 08-104528, Hoya Corp., Apr. 1996.
Glass Handbook issued by Asakura Publishing Co., 1975 (4th edition, received Nov. 6, 1981); pp. 631 and 920; Partial translation thereof.

* cited by examiner

*Primary Examiner* — Michael Cleveland
*Assistant Examiner* — Michael Wieczorek
(74) *Attorney, Agent, or Firm* — Nixon & Vanderhye P.C.

(57) ABSTRACT

An information recording medium is prepared by forming a multi-layered film, including an information recording layer, on a substrate by transferring the substrate heated at an average heating rate of at least 10° C./second in a heating zone, along consecutive film-forming zones, and consecutively forming layers forming the multi-layered film in the film-forming zones.

4 Claims, No Drawings

SUBSTRATE FOR INFORMATION RECORDING MEDIUM, INFORMATION RECORDING MEDIUM AND PROCESS FOR PRODUCING INFORMATION RECORDING MEDIUM

This application is a divisional of application Ser. No. 10/437,430, now U.S. Pat. No. 7,208,238 filed May 14, 2003 which claims priority of Japanese patent applications 2003-23033 filed Jan. 31, 2003 and 2003-43613 filed Feb. 21, 2003, the entire content of which is hereby incorporated by reference in this application.

BACKGROUND OF THE INVENTION

1. Field of the Invention

The present invention relates to a substrate for an information recording medium, an information recording medium and a process for producing an information recording medium. More specifically, the present invention relates to a substrate for an information recording medium which substrate has high infrared irradiation-heating efficiency, an information recording medium comprising a multi-layered film having an information recording layer formed on the substrate, and a process for producing an excellent information recording medium which comprises keeping the substrate in a temperature state suitable for forming the multi-layered film.

2. Related Art Statement

As a substrate for an information recording medium such as a magnetic disk, conventionally, there is used a substrate made of a lithium-containing aluminosilicate glass having a high Young's modulus (e.g., JP-A-2001-180969) or a substrate made of a crystallized glass having a crystal layer precipitated by heat treatment of a glass having a specific composition (e.g., JP-A-2000-119042).

The information recording medium is produced by forming a multi-layered film including an information recording layer on the above substrate. When the multi-layered film is formed on the above substrate, for example, the substrate is first introduced into a substrate-heating zone of a film-forming apparatus and heated up to a temperature at which a film is formable by sputtering. After the temperature of the substrate is sufficiently increased, the substrate is transferred to a first film-forming zone, and a layer corresponding to the lowermost layer of a multi-layered film is formed on the substrate. Then, the substrate is transferred to a second film-forming zone, and a layer is formed on the lowermost layer. The substrate is transferred along film-forming zones toward a backward end zone to form layers as described above, whereby the multi-layered film including an information recording layer is formed on the substrate. Since the above heating and film formation are carried out under a low pressure attained by gas exhaustion with a vacuum pump, the above heating is inevitably performed by a non-contact method. Heating by radiation is therefore suitable for heating the substrate.

It is required to perform the above film formation before the temperature of the substrate comes to be lower than the temperature suitable for the film formation. When the layer formation takes too long, the temperature of the substrate decreases, and there is caused a problem that it is difficult to attain a substrate temperature sufficient for forming a layer in a film-forming zone positioned at a later stage. For keeping the substrate at a film-formable temperature for a long period time, it may be thinkable to heat the substrate to a higher temperature. When the substrate heating rate is small, it is required to increase the heating time period, and it is also required to increase the residence time period of the substrate in the heating zone. The residence time period of the substrate in each film-forming zone comes to be longer, and it is no longer possible to maintain the sufficient substrate temperature in the film-forming zone at a later stage. Further, there is no way to improve a throughput, either.

For increasing the heating rate, there may be possibly employed a means of irradiating the substrate with light having higher power. However, the problem is that a substrate made of a glass or a substrate made of a crystallized glass has low light absorption, so that it is difficult to attain sufficient heating efficiency.

SUMMARY OF THE INVENTION

Under the circumstances, it is an object of the present invention to provide a substrate for an information recording medium which substrate has high infrared irradiation heating efficiency, an information recording medium comprising a multi-layered film including an information recording layer formed on the substrate, and a process for producing an information recording medium, in which a good information recording medium is fabricated by keeping the above substrate in a temperature state suitable for forming the multi-layered film or performing sufficient heating of the substrate within a short period of time.

For achieving the above object, the present inventors have made diligent studies and, as a result, have found that (1) a substrate made of a glass or crystallized glass having a region that has a spectral transmittance of a predetermined value or less in a specific wavelength range, (2) a substrate made of a glass or crystallized glass showing a spectral transmittance of a predetermined value or less over specific wavelength range, (3) a substrate made of a glass or crystallized glass containing an infrared absorbent made of a specific metal oxide, or (4) a substrate made of a glass or crystallized glass having a predetermined content of water suits the above object as a substrate for an information recording medium. And, it has been found that a good information recording medium can be produced by heating any one of these substrates by irradiation with infrared ray and forming a multi-layered film including an information recording layer or by forming a multi-layered film including an information recording layer on the substrate under heat at an average heating rate of a predetermined value or larger in a heating zone. The present invention has been completed on the basis of the above finding.

That is, according to the present invention, there are provided;

(1) a substrate for an information recording medium, which is made of a glass or crystallized glass having a region that has a spectral light transmittance of 50% or less converted in terms of a thickness of 2 mm in a wavelength range of 2,750 nm to 3,700 nm (to be referred to as "substrate 1" hereinafter), (2) a substrate for an information recording medium, which is made of a glass or crystallized glass showing a spectral light transmittance of 70% or less converted in terms of a thickness of 2 mm over whole wavelength range of 2,750 nm to 3,700 nm (to be referred to as "substrate 2" hereinafter), (3) a substrate for an information recording medium, which is made of a glass or crystallized glass containing an infrared absorbent that is an oxide of at least one metal selected from iron, copper, cobalt, ytterbium, manganese, neodymium, praseodymium, niobium, cerium, vanadium, chromium, nickel, molybdenum, holmium or erbium, and which is for use in a perpendicular magnetic recording medium (to be referred to as "substrate 3" hereinafter), (4) a substrate for an information recording medium as recited in the above (1), (2) or (3), which is to be heated by irradiation with infrared ray, (5) a substrate for an information recording medium, which is made of a glass or crystallized glass, contains more than 200 ppm of water and is to be heated by irradiation with infrared ray (to be referred to as "substrate 4" hereinafter), (6) a substrate for an information recording medium, which is made of a glass or crystallized glass containing an infrared absorbent that is an oxide of at least one metal selected from iron, copper, cobalt, ytterbium, manganese, neodymium, praseodymium, niobium, cerium, vanadium, chromium, nickel, molybdenum, holmium or erbium, and which is for use as a substrate to support a multi-layered film to be formed by sputtering after heating by irradiation with infrared ray, the multi-layered film including an information recording layer (to be referred to as "substrate 5"), (7) an information recording medium comprising a multi-layered film formed on the substrate for an information recording medium as recited in any one of the above (1) to (6), the multi-layered film including an information recording layer, (8) a process for producing an information recording medium by forming a multi-layered film including an information recording layer on a substrate for an information recording medium, the process comprising transferring said substrate heated at an average heating rate of at least 10° C./second in a heating zone, along consecutive film-forming zones, and consecutively forming layers for constituting said multi-layered film in the film-forming zones to form the multi-layered film (to be referred to as "process 1" hereinafter), (9) a process for producing an information recording medium as recited in the above (8), wherein the substrate for an information recording medium is transferred to have a residence time period in the heating zone and a residence time period in each film-forming zone, which residence time periods are equal to each other.

(10) a process for producing an information recording medium as recited in the above (8) or (9), wherein such substrates for information recording media are synchronously transferred into, and out of, the heating zone and each film-forming zone,

(11) a process for producing an information recording medium as recited in the above (8), (9) or (10), wherein the substrate for an information recording medium is heated by irradiation with infrared ray,

(12) a process for producing an information recording medium, which comprises heating the substrate for an information recording medium as recited in any one of the above (1) to (6) by irradiation with infrared ray and forming a multi-layered film including an information recording layer on said substrate (to be referred to as "process 2" hereinafter),

(13) a process for producing an information recording medium, which comprises forming an information recording layer on the substrate for an information recording medium as recited in any one of the above (1) to (5) and heating the substrate by irradiation with infrared ray (to be referred to as "process 3" hereinafter), and

(14) a process for producing an information recording medium, which comprises forming an information recording layer on a substrate for an information recording medium which substrate is made of a glass or crystallized glass containing an infrared absorbent that is an oxide of at least one metal selected from iron, copper, cobalt, ytterbium, manganese, neodymium, praseodymium, niobium, cerium, vanadium, chromium, nickel, molybdenum, holmium or erbium, and heating the substrate by irradiation with infrared ray (to be referred to as "process 4" hereinafter).

PREFERRED EMBODIMENTS OF THE INVENTION

Preferred embodiments of the present invention will be explained in the order of the substrate for an information recording medium, the information recording medium and the process for producing an information recording medium.

<Substrate for an Information Recording Medium>

The substrate for an information recording medium, provided by the present invention, has been completed on the basis of the following finding.

A glass containing $SiO_2$ and $Al_2O_3$ or a glass containing $SiO_2$ and $B_2O_3$ particularly suitable as a substrate for an information recording medium has an absorption peak in a region including a wavelength of 2,750 to 3,700 nm. A crystallized glass thereof also has the above feature.

For efficiently heating a substrate made of the glass or a substrate made of the crystallized glass by irradiation with infrared ray, it is desirable to use infrared ray having a maximum in the above wavelength region.

When a substrate is heated by irradiation with infrared ray, some layers formed on the substrate reflect part of the infrared ray, and the power of the infrared ray to be absorbed decreases, so that it is desirable to heat the substrate before the initiation of formation of the layers. When the formation of an information recording layer is followed by heating the substrate by irradiation with infrared ray, a sufficiently large heating effect can be attained by the use of a substrate having a large infrared absorption.

For increasing the heating rate, it is thinkable to match the wavelength which has a maximum spectral intensity of infrared ray and the absorption peak wavelength of a substrate with each other and increase the infrared ray power. In the case of a carbon heater in a high-temperature state as an infrared ray source, the input of the carbon heater can be increased for increasing the power of infrared ray. However, if the radiation from the carbon heater is taken as a blackbody radiation, the heater temperature increases due to an increase in the input, so that the maximum wavelength of spectrum of the infrared ray shifts toward a shorter wavelength side and deviates from the above absorption wavelength region of the glass. It is therefore required to increase the consumption power of the heater to excess for increasing the heating rate to the substrate, and there is caused a problem that the lifetime of the heater is decreased.

In view of the above points, desirably, the absorption of the glass in the above wavelength region is increased, the irradiation with infrared ray is performed in a state where the spectral maximum wavelength of infrared ray and the absorption peak wavelength of the substrate are brought to close to each other, and the heater input is not increased to excess.

Since the substrate has the form of a thin plate such as the form of a disk, the following substrates for an information recording medium are desirable for increasing the heating efficiency.

On the basis of the above finding, it has been found that the substrate for an information recording medium that permits efficient heating by irradiation with infrared ray before the formation of a multi-layered film including an information recording layer (any layer that is formed before the formation of an information recording layer and is formable without heating may be excluded from the above multi-layered film) or after the formation of an information recording layer includes the following substrates 1 to 5.

(Substrate 1)

The substrate 1 is a substrate for an information recording medium, which is made of a glass or crystallized glass having a region that has a spectral light transmittance of 50% or less converted in terms of a thickness of 2 mm in a wavelength range of 2,750 nm to 3,700 nm.

The substrate 1 includes a chemically strengthened substrate and a substrate that is not chemically strengthened. When the substrate is chemically strengthened, an ion-exchanged layer is present in the vicinity of a surface. Except for this portion, the substrate is composed of a homogeneous glass. When the substrate is not chemically strengthened, the entire substrate is made of a homogenous glass or crystallized glass. A homogeneous portion comes to have a constant absorption coefficient and a constant scattering coefficient, and the above spectral transmittance can be therefore converted on the basis of a known conversion method with regard to substrates that are different in thickness. Even if the ion-exchanged layer formed by chemical strengthening is present, the absorption coefficient of the entire substrate can be considered constant. The spectral transmittance is measured by arranging the measurement light incidence upon a surface (to be referred to as "main surface") where an information recording layer is to be formed such that the incidence is perpendicular to the main surface. The spectral transmittance includes effects caused by the reflection and scattering of light on the substrate surface in addition to the absorption and scattering of light inside the substrate. The main surface of the substrate for an information recording medium is required to have high flatness and smoothness.

The substrate 1 has the above spectral transmittance property, so that the efficiency of heating by irradiation with infrared ray can be increased. Further, when the multi-layered film including an information recording layer is formed, the substrate 1 can be heated at a high heating rate. Further, the substrate having an information recording layer formed thereon can be fully heated by irradiation with infrared ray.

(Substrate 2)

The substrate 2 is a substrate for an information recording medium, which is made of a glass or crystallized glass showing a spectral light transmittance of 70% or less converted in terms of a thickness of 2 mm over whole wavelength range of 2,750 nm to 3,700 nm.

The substrate 2 having high absorption over the above wavelength range can produce the same effect as that of the substrate 1. The homogeneity, the spectral transmittance measurement and the conversion method in the substrate 2 are the same as those in the substrate 1. Preferably, the substrate 2 also has the properties of the substrate 1 in combination with its own properties. That is, the spectrum of infrared ray radiated from an infrared ray source in broad and has some extent, and preferably, the wavelength region at which the large absorption takes place is present over a wide range including the maximum spectral wavelength region of the infrared ray, for efficiently absorbing the ray.

The substrate 2 has the above spectral transmittance property, so that the efficiency of heating by irradiation with infrared ray can be improved, and that the substrate can be heated at a high heating rate for forming the multi-layered film including an information recording layer. Further, the substrate having an information recording layer formed thereon can be fully heated by irradiation with infrared ray.

When the substrate 1 or the substrate 2 is made of a crystallized glass, the above spectral transmittance is dependent upon the size and density of crystal grains in the crystallized glass. When the crystal grains have a large size, scattering by the crystal grains accounts for a larger portion of a decrease in the spectral transmittance, and even if the absorption is small, the spectral transmittance comes to be smaller than the predetermined value above. When the substrate of the present invention is made of a crystallized glass, the size of the crystal grains is preferably 100 nm or less. When the crystal grains have a size in this range, the scattering of infrared ray by the crystal grains is small, and it is considered that the density of the crystal grains does not affect the spectral transmittance. The main factor for determining the above spectral transmittance is therefore the infrared absorption of the crystallized glass. When the substrate 1 and the substrate 2 are made of a crystallized glass each, the size of the crystal grains is preferably in the above range. The size of the crystal grains is more preferably in the range that does not exceed 50 nm, and particularly preferably in the range of 1 to 50 nm.

(Substrate 3)

The substrate 3 is a substrate for an information recording medium, which is made of a glass or crystallized glass containing an infrared absorbent that is an oxide of at least one metal selected from iron, copper, cobalt, ytterbium, manganese, neodymium, praseodymium, niobium, cerium, vanadium, chromium, nickel, molybdenum, holmium or erbium, and which is for use in a perpendicular magnetic recording medium.

The above infrared absorbent exhibits intense light absorption in an infrared region when it is in a glass or crystallized glass. The substrate 3 is used in a perpendicular magnetic recording medium. In the production of a perpendicular magnetic recording medium, a multi-layered film including a magnetic recording layer is annealed at a high temperature. The perpendicular magnetic recording medium is therefore heat-treated at a higher temperature than a longitudinal-magnetic-recording-mode medium, and it is therefore required to heat the substrate therefor to a high temperature. Further, when the substrate is heated by irradiation with infrared ray after the formation of a seed layer and a soft magnetic layer on the substrate, it is required to heat the substrate to a desired temperature in a short period of time. When the substrate on which a magnetic recording layer is formed is heated by irradiation with infrared ray, it is required to fully increase the temperature of the substrate by allowing the substrate to fully absorb infrared ray that reaches the substrate. For this purpose, it is required to increase the efficiency of heating the substrate by irradiation with infrared ray. According to the substrate 3, the light absorption in an infrared region is increased by adding the infrared absorbent, so that the heating suitable for producing a perpendicular magnetic recording medium can be efficiently carried out.

In the production of a perpendicular magnetic recording medium in which the above heating is carried out, a substrate temperature of 200° C. or higher is required, so that the substrate is heated to a temperature that is 200° C. or higher and is less than the glass transition temperature of a material constituting the substrate. The temperature for heating the substrate is preferably at least 250° C. and less than the glass transition temperature of a material constituting the substrate, more preferably at least 300° C. and less than the glass transition temperature of a material constituting the substrate, still more preferably at least 450° C. and less than the glass transition temperature of a material constituting the substrate. Of the above ranges, particularly preferably, the above temperature is in a range that does not exceed 550° C.

When an oxide of iron of the above infrared absorbents is incorporated alone, the content thereof as $Fe_2O_3$ by weight is preferably in the range of 500 ppm to 5%, more preferably 2,000 ppm to 5%, still more preferably 2,000 ppm to 2%, yet more preferably 4,000 ppm to 2%. By the introduction of iron oxide, the absorption in and near a wavelength of 1,000 nm can be increased. The spectral transmittance at a wavelength of 1,000 nm when the thickness is 2 mm is 90% or less.

Preferably, the above substrate 3 also has the properties of the substrate 1, the properties of the substrate 2, or the properties of the substrates 1 and 2, in combination with its own properties.

The above substrate 1, 2 and 3 are suitable for heating by irradiation with infrared ray. The heating by irradiation with infrared ray will be discussed later.

(Substrate 4)

The substrate 4 is a substrate for an information recording medium, which is made of a glass or crystallized glass, contains more than more than 200 ppm of water and is to be heated by irradiation with infrared ray.

The above water includes OH groups, and the content thereof is shown as $H_2O$. Water or OH group has intense absorption in a 3 µm band. Therefore, the substrate made of a glass or crystallized glass containing more than 200 ppm of water comes to have large light absorption in a 3 µm band, that is, in and around a wavelength of 2,750 to 3,700 nm, so that the heating efficiency during heating by irradiation with infrared ray can be increased and that the heating rate to the substrate can be improved. The above water content is preferably 220 ppm or more.

Preferably, the above substrate 4 also has the properties of the substrate 1, the properties of the substrate 2, or the properties of the substrates 1 and 2, in combination with its own properties. Further, the substrate 4 is also suitable as a substrate for a perpendicular magnetic recording medium.

(Substrate 5)

The substrate 5 is a substrate for an information recording medium, which is made of a glass or crystallized glass containing an infrared absorbent that is an oxide of at least one metal selected from iron, copper, cobalt, ytterbium, manganese, neodymium, praseodymium, niobium, cerium, vanadium, chromium, nickel, molybdenum, holmium or erbium, and which is for use as a substrate for a multi-layered film to be formed by sputtering after heating by irradiation with infrared ray, the multi-layered film including an information recording layer.

The above multi-layered film to be formed by sputtering after heating by irradiation with infrared ray includes (1) a multi-layered film formed by heating a substrate for an information recording medium in a heating zone and then transferring the substrate to a plurality of consecutive film-forming zone and forming layers by sputtering in the film-forming zones, (2) a multi-layered film that is included in the multi-layered film in the above (1) and is formed by transferring the substrate such that its residence time period in the heating zone and its residence time period in each film-forming zone are equal to each other, and (3) a multi-layered film that is included in the multi-layered film in the above (1) and is formed by synchronously transferring the substrate into, and out of, the above heating zone and the film-forming zones. In the formation of the multi-layered film in any one of the above (1) to (3), the heating of the substrate and the formation of layers by sputtering are carried out in vacuum or under a low pressure. The above heating is preferably carried out by irradiation with infrared ray, which permits efficient heating in vacuum or under a low pressure. While the substrate 5 is suitable not only as a substrate for stationary and opposed sputtering but as a substrate for an in-line type sputtering, the substrate 5 is more preferred for use as a substrate for stationary and opposed sputtering and particularly preferred as a substrate for single-substrate-feed stationary and opposed sputtering.

The residence time period of the glass or crystallized glass in the heating zone and the residence time period of the substrate in each film-forming zone are preferably 2 to 20 seconds each. The average heating rate to the substrate is desirably at least 10° C./second, more desirably at least 15° C./second, still more desirably at least 20° C./second, far more desirably at least 30° C./second. The average heating rate refers to a value obtained by dividing a difference between the temperature that the substrate has before heating and the temperature that the substrate has after the heating, with a heating time period. For preventing damage caused on the substrate by rapid heating, the average heating rate is preferably adjusted to 200° C./second or less.

The above infrared absorbent is an additive for enhancing the absorption of infrared ray as explained in with regard to the substrate 3. The amount of the infrared absorbent is as described with regard to the substrate 3.

Preferably, the above substrate 5 also has the properties of the substrate 1, the properties of the substrate 2, the properties of the substrates 1 and 2, or the properties of the substrate 4, in combination with its own properties. Further, the substrate 5 is also suitable as a substrate for a perpendicular magnetic recording medium.

The heating of any one of the above substrates 1 to 5 by irradiation with infrared ray is carried out when the multi-layered film including an information recording layer is formed on such a substrate or immediately before the above formation of the multi-layered film. For the heating by irradiation with infrared ray, an infrared ray source having a maximum wavelength of a radiation spectrum in a wavelength region of 2,750 to 3,700 nm is suitable. Such an infrared ray source is suitably a heater. When the heater can be considered a blackbody, the temperature of the heater is preferably adjusted to 600 K to 1,000 K, more preferably to 700 K to 900 K, for matching the maximum wavelength of radiation spectrum to the vicinity of absorption peak of the substrate.

The heater is suitably a carbon heater. Since the heater is arranged in a heating chamber, the partial pressure of oxygen in the heating atmosphere is decreased, so that the deterioration of the carbon heater by oxidation can be decreased.

The center-line average roughness Ra of main surface of the substrate is preferably 0.05 to 1 nm for the smoothness that a substrate for an information recording medium is required to have and for a reason that scattering of infrared ray on the surface is decreased.

The flatness and parallelism of the substrate can be determined depending upon demands that information recording media are required to satisfy.

Each substrate has the form of a disk having a central hole, has an outer diameter of approximately 10 to 95 mm and has a uniform thickness, and the thickness is preferably in the range of 0.1 to 2 mm.

When the substrate is heated, preferably, the surface (main surface) where the multi-layered film including an information recording layer is to be formed in the above substrate is irradiated with infrared ray.

Infrared ray is reflected on the above multi-layered film to some extent. It is therefore desirable to carry out the heating by irradiation with infrared ray before the formation of the multi-layered film or after the formation of a layer formable without heating (e.g., after the formation of a seed layer and a soft magnetic layer in a perpendicular magnetic recording medium). However, when the substrate having an information recording layer formed thereon is heated by irradiation with infrared ray, a sufficient heating effect can be attained even if the power of infrared ray that reaches the substrate is decreased by reflections on the information recording layer surface, since the substrate is improved in the capability of absorbing infrared ray.

Since each of the above substrates has large infrared absorption, the rate of temperature decrease caused by infrared radiation is small as compared with any other substrate having small infrared absorption. The above substrates therefore maintain a substrate temperature suitable for forming films for a relatively long period of time. It is also advantageous for the following point that the cooling rate of the glass constituting the above substrates or the matrix glass of the crystallized glass constituting the above substrates is small. In the above substrates, a plastic-deformable glass in a high-temperature state is shaped, or the thus-shaped glass is machined, to form a desired shape. The above glass has a low cooling rate in a high-temperature state, so that the shaping can take a longer time and is hence made easy. For these reasons, press shaping and float shaping are suitable, and press shaping is particularly suitable, for the above shaping.

The glass and the crystallized glass or its matrix glass (glass to be heat-treated to form the crystallized glass) suitable for the above substrates 1 to 5 will be explained with regard to their compositions below.

Each substrate has a suitable composition that is improved in the infrared absorption by adding water or an infrared absorbent to the following basic composition. The common point in the basic composition is that the basic composition contains $SiO_2$ and $Al_2O_3$. A composition containing $SiO_2$ and $Al_2O_3$ originally has a clear absorption peak in the vicinity of wavelength of 3 μm and is hence preferred as a basic composition. In the method of adding the infrared absorbent, it is preferred to add an oxide of any additive to a formulated material. For adding the water, a hydroxide is used as a raw material, a gas containing steam is bubbled in a molten glass, or the use of a hydroxide as a raw material and the above bubbling are combined. It is preferred to use a hydroxide as a raw material. Particularly, for a composition containing $SiO_2$ and $Al_2O_3$, it is preferred to use aluminum hydroxide so that a desired content of water is attained.

Further, a glass or crystallized glass containing $SiO_2$ and $B_2O_3$ is also preferred. In this case, it is preferred to use $H_3BO_3$ as a raw material for the glass or crystallized glass.

The basic composition preferably includes the following compositions.

(Composition 1)

The composition 1 is a composition containing, by % by weight, 62 to 75% of $SiO_2$, 5 to 15% of $Al_2O_3$, 4 to 10% of $Li_2O$, 4 to 12% of $Na_2O$ and 5.5 to 15% of $ZrO_2$, and having an $Na_2O/ZrO_2$ weight ratio of 0.5 to 2.0 and an $Al_2O_3/ZrO_2$ weight ratio of 0.4 to 2.5. A glass having the above composition is preferably applied to the substrate as an amorphous glass.

The composition 1 can realize a deep compression stress layer, high deflective strength and a high Knoop hardness by chemical strengthening, and since it has a large Knoop hardness and a large Vicker's hardness, it has excellent properties as a chemically strengthened substrate. The above chemical strengthening is preferably carried out by ion-exchange in a treatment bath containing Na ion and/or K ion. As a treatment bath containing Na ion and/or K ion, it is preferred to use a treatment bath containing sodium nitrate and/or potassium nitrate. However, the ion source shall not be limited to nitrates, and it can be selected from sulfates, hydrogen sulfates, carbonates, hydrogen carbonates or halides. When the treatment bath contains Na ion, the Na ion undergoes ion-exchange with Li ion in the glass. When the treatment bath contains K ion, the K ion undergoes ion-exchange with Na ion in the glass. When the treatment bath contains Na ion and K ion, the Na ion and K ion undergo ion-exchange with. Li ion and Na ion in the glass, respectively. In the above ion-exchange, an alkali metal ion in the surface layer portion of the glass is replaced with an alkali metal ion having a large ionic radius, and a compression stress layer is therefore formed in the surface layer portion of the glass, so that the glass is chemically strengthened.

The composition 1 is preferably a composition containing, by % by weight, 63 to 71% of $SiO_2$, 7 to 14% of $Al_2O_3$, 4 to 7% of $Li_2O$, 6 to 11% of $Na_2O$ and 6 to 12% of $ZrO_2$, and having an $Na_2O/ZrO_2$ weight ratio of 0.7 to 1.8 and an $Al_2O_3/ZrO_2$ weight ratio of 0.6 to 2.0.

The composition 1 may contain a generally used clarifier such as $Sb_2O_3$.

In the above basic composition, hydroxyl group bonds to water in the glass and intensely works to retain water in the glass, so that there can be obtained the property of suitable infrared absorption by the addition of a predetermined amount of water. Further, the property of suitable infrared absorption can be also easily obtained by adding the infrared absorbent.

The above glass can be produced as follows. A glass material formulated so as to obtain a desired composition is melted under heat at approximately 1,500 to 1,600° C. for approximately 5 to 8 hours, to shape the glass into a desired form. The composition 1 is suitable for press-shaping.

(Composition 2)

The composition 2 is a composition containing, by mol %, 40 to 65% of $SiO_2$, 1 to 10% of $Al_2O_3$, 5 to 25% of $Li_2O$, 0 to 15% of $Na_2O$, 0 to 30% of CaO, 0 to 20% of MgO (CaO and MgO having a total content of 2 to 30%), 0 to 10% of $TiO_2$ and 0 to 10% of $ZrO_2$ ($TiO_2$ and $ZrO_2$ having a total content of 2 to 20%), the total content of the above components being at least 95%. A glass having the above composition is preferably applied to the substrate as an amorphous glass. Further, a glass having the above composition can be efficiently improved in substrate strength by chemical strengthening, so that the composition has excellent properties as a substrate to be chemically strengthened and a chemically strengthened substrate.

The composition 2 has a first preferred composition range, and the composition 2 of the first composition range contains, by mol %, 40 to 65% of $SiO_2$, 1 to 10% of $Al_2O_3$, 5 to 25% of $Li_2O$, 1 to 15% of $Na_2O$, 1 to 30% of CaO, 0 to 10% of MgO (MgO and CaO having a total content of 2 to 30%), 0.1 to 10% of $TiO_2$ and 1 to 10% of $ZrO_2$ ($TiO_2$ and $ZrO_2$ having a total content of 2 to 15%), the total content of the above components being at least 95%. More preferably, the content of $ZrO_2$ is greater than the content of $TiO_2$.

The composition 2 has a second preferred composition range, and the composition 2 of the second composition range contains, by mol %, 45 to 65% of $SiO_2$, 2 to 8% of $Al_2O_3$, 8 to 20% of $Li_2O$, 1 to 10% of $Na_2O$, 5 to 25% of CaO, 0 to 8% of MgO (MgO and CaO having a total content of 5 to 25%), 0.1 to 8% of $TiO_2$ and 3 to 8% of $ZrO_2$ ($TiO_2$ and $ZrO_2$ having a total content of 3.1 to 12%), the total content of the above components being at least 95%. More preferably, the content of $ZrO_2$ is greater than the content of $TiO_2$.

In the above preferred composition ranges, further, the total content of $Li_2O$ and $Na_2O$ is preferably 10 to 25%, and the content of $SiO_2$ is preferably more than 50% but less than 65%. Further, the content of $Al_2O_3$ is preferably at least 2% but less than 6%, and the content of CaO is preferably more than 9% but not more than 25%. Further, the content of $Li_2O$ is preferably at least 10%, and the content of $TiO_2$ is preferably at least 0.2% but less than 5%.

In the above compositions, particularly preferably, the total content of $SiO_2$, $Al_2O_3$, $Li_2O$, $Na_2O$, $ZrO_2$, $TiO_2$, CaO and MgO is 100%, or less than 1% by weight, based on such a composition, of $Sb_2O_3$ is incorporated.

According to the above basic composition, hydroxyl group bonds to water in the glass and intensely works to retain water in the glass, so that there can be obtained the property of suitable infrared absorption by the addition of a predetermined amount of water. Further, the property of suitable infrared absorption can be also easily obtained by adding the infrared absorbent.

The composition 2 has excellent water resistance. The water resistance can be represented by Rab/Raf, in which Raf is a center-line average roughness of a surface of a glass substrate having the basic composition of the composition 2 when the glass is held in water having a temperature of 80° C. for 24 hours and Rab is a central line average roughness measured before the above holding. A glass substrate having the composition 2 generally has an Rab/Raf value of 0.8 to 1. As the Rab/Raf value is closer to 1, the glass substrate has better water resistance and smaller surface roughness deterioration. The Rab/Raf value is preferably 0.84 to 1. Further, the central line average roughness Rab before the glass is held in water is preferably in the range of 0.1 to 0.5. The above Rab and Raf can be measured by means of an atomic force microscope (AFM).

The glass substrate preferably has a Young's modulus of 90 to 120 GPa, more preferably 95 to 120 GPa.

The glass substrate having the composition 2 can be therefore applied to an information recording medium excellent in stability during high-speed rotation, and there can be provided a substrate for an information recording medium which substrate has remarkably high surface smoothness.

For matching the thermal expansion property of the substrate and the thermal expansion property of a fixing member to fix an information recording medium, the glass substrate preferably has an average linear thermal expansion coefficient, measured at 100 to 300° C., of $80 \times 10^{-7}$/° C. or more.

Further, while the glass substrate satisfies the above water resistance, Young's modulus and expansion coefficient, the glass substrate preferably has a specific gravity of 3.1 or less, more preferably 2.9 or less. For example, the glass composition can be determined so as to attain a specific gravity of 2.3 to 2.9. Further, decreasing specific gravity is also preferred for decreasing the heat capacity of the substrate.

The glass substrate having the composition 2 is chemically strengthened in the same manner as in the chemical strengthening of the glass substrate having the composition 1.

In view of the chemical strengthening step and/or the step of forming an information recording layer, the glass substrate material preferably has a glass transition temperature of 500° C. or higher. When the glass transition temperature is too low, there is caused a problem that sodium nitrate or potassium nitrate to be used for the chemical strengthening cannot be melted under the above temperature condition or that the substrate is deformed by heating employed for forming an information recording layer or the like on the glass substrate. While these points are taken into account, the glass composition can be determined so as to attain a glass transition temperature Tg of 500 to 600° C.

The glass substrate shows almost no change in Young's modulus, the above expansion coefficient, glass transition temperature and specific gravity between the glass substrate to be chemically strengthened and the chemically strengthened glass substrate, and the Rab/Raf value remains unchanged or increases (the upper limit thereof is 1). The above composition has excellent water resistance, and the substrate thereof has no surface roughening even when washed.

The composition 2 suitable for press-shaping.

(Composition 3)

The composition 3 is a composition containing, by mol %, 35 to 70% of $SiO_2$, 1 to 15% of $Al_2O_3$, 1 to 45% of CaO, 3 to 45% of total of MgO and the CaO, 3 to 30% of total of $Li_2O$ and $Na_2O$, and 0.1 to 10% of $TiO_2$. The above composition is suitable as a basic composition for an amorphous glass substrate and has a high Young's modulus and excellent press-shapability. Further, it is also suitable for a chemically strengthened glass substrate.

According to the above basic composition, hydroxyl group bonds to water in the glass and intensely works to retain water in the glass, so that there can be obtained the property of suitable infrared absorption by the addition of a predetermined amount of water. Further, the property of suitable infrared absorption can be also easily obtained by adding the infrared absorbent.

(Composition 4)

The composition 4 is a composition containing, by mol %, 45 to 70% of $Sio_2$, 1 to 15% of $Al_2O_3$ (the total content of $Sio_2$ and $Al_2O_3$ being 57 to 85%), 2 to 25% of CaO, 0 to 15% of BaO, 0 to 15% of MgO, 0 to 15% of SrO, 0 to 10% of ZnO (the total content of MgO, CaO, SrO, Bao and ZnO being 2 to 30%), 2 to 15% of $K_2O$, 0 to 8% of $Li_2O$, 0 to 8% of $Na_2O$ (the total content of $K_2O$, $Li_2O$ and $Na_2O$ being 2 to 15%), 0 to 12% of $ZrO_2$ and 0 to 10% of $TiO_2$, the total content of the above components being at least 95%. A glass having the above composition is preferably applied to the substrate as an amorphous glass. In the above composition range, a glass having a relatively high glass transition temperature can be stably obtained, so that such a glass is suitable as a substrate that is not thermally deformed even by high-temperature heat treatment. The above composition is therefore a basic composition suitable for a substrate for a perpendicular magnetic recording medium.

Further, the composition 4 is preferably a composition containing, by mol %, 50 to 67% of $SiO_2$, 2 to 12% of $Al_2O_3$ (the total content of $SiO_2$ and $Al_2O_3$ being 57 to 79%), 3 to 20% of CaO, 0 to 14% of BaO, 0 to 10% of MgO, 0 to 10% of SrO, 0 to 8% of ZnO (the total content of MgO, CaO, SrO, BaO and ZnO being 3 to 30%), 0 to 5% of $Li_2O$, 0 to 5% of $Na_2O$, 4 to 12% of $K_2O$ (the total content of $K_2O$, $Li_2O$ and $Na_2O$ being 4 to 12%), 0 to 10% of $ZrO_2$ and 0 to 8% of $TiO_2$.

In the above composition ranges, particularly, the total content of $SiO_2$, $Al_2O_3$, MgO, CaO, BaO, $K_2O$ and $ZrO_2$ is preferably at least 98%, more preferably at least 99%, still more preferably 100%. While the above composition may contain a small amount of $Sb_2O_3$, a fluoride, a chloride, $SO_3$ and $As_2O_3$ as an anti-foaming agent as required, the content thereof based on the composition is preferably 2% by weight or less as an approximate limit, and more preferably 1% by weight or less. It is desirable not to use any arsenic compound such as $As_2O_3$ from the viewpoint of environmental protection.

The above composition containing no $TiO_2$ is excellent in decreasing the roughening of the surface of a substrate.

The above composition is excellent in that the glass transition temperature thereof is generally at least 620° C., preferably at least 650° C., more preferably at least 680° C., still more preferably at least 700° C., or it has high heat resistance. While the upper limit of the above glass transition temperature is not specially limited, it is generally approximately 900° C. Since the above composition has such high heat resistance, the deformation of a substrate can be prevented when high-temperature treatment is carried out in the process of producing a perpendicular magnetic recording medium.

According to the above basic composition, hydroxyl group bonds to water in the glass and intensely works to retain water in the glass, so that there can be obtained the property of suitable infrared absorption by the addition of a predetermined amount of water. Further, the property of suitable infrared absorption can be also easily obtained by adding the infrared absorbent.

Further, the above composition permits chemical strengthening. In this case, preferably, ion-exchange is carried out by immersing a substrate in a molten salt containing K ion.

Further, the above composition is excellent in durability against acids such as hydrosilicofluoric acid and water resistance, and the no surface of a substrate is roughened even if the substrate is treated with an acid or washed.

The composition 4 is suitable for press-shaping and a float-shaping, and particularly suitable for press-shaping. However, when float-shaping is employed, it is imperative to avoid the addition of any one of $Sb_2O_3$ and $As_2O_3$.

(Composition 5)

The composition 5 is a composition containing, by mol %, 55 to 70% of $SiO_2$, 1 to 12.5% of $Al_2O_3$, 5 to 20% of $Li_2O$, 0 to 12% of $Na_2O$, 0 to 2% of $K_2O$, 0 to 8% of MgO, 0 to 10% of CaO, 0 to 6% of SrO, 0 to 2% of BaO, 0 to 8% of $TiO_2$ and 0 to 4% of $ZrO_2$. A glass having the above composition is preferably applied to the substrate as an amorphous glass. A substrate made of the above composition can be efficiently improved in strength by chemical strengthening, so that the composition has excellent properties as a substrate to be chemically strengthened and a chemically strengthened substrate.

According to the above basic composition, hydroxyl group bonds to water in the glass and intensely works to retain water in the glass, so that there can be obtained the property of suitable infrared absorption by the addition of a predetermined amount of water. Further, the property of suitable infrared absorption can be also easily obtained by adding the infrared absorbent.

The composition 5 is suitable for press-shaping and a float-shaping. However, when float-shaping is employed, it is imperative to avoid the addition of any one of $Sb_2O_3$ and $As_2O_3$.

(Composition 6)

The composition 6 is a composition containing 58 to 66% of $SiO_2$, 13 to 19% of $Al_2O_3$, 3 to 4.5% of $Li_2O$, 6 to 13% of $Na_2O$, 0 to 5% of $K_2O$, 10 to 18% of $R_2O$ ($R_2O=Li_2O+Na_2O+K_2O$), 0 to 3.5% of MgO, 1 to 7% of CaO, 0 to 2% of SrO, 0 to 2% of BaO, 2 to 10% of R'O (R'O=MgO+CaO+SrO+BaO) and 0 to 2% of $TiO_2$. A glass having the above composition is preferably applied to the substrate as an amorphous glass. A substrate made of the above composition can be efficiently improved in strength by chemical strengthening, so that the composition has excellent properties as a substrate to be chemically strengthened. The above glass may be therefore chemically strengthened.

According to the above basic composition, hydroxyl group bonds to water in the glass and intensely works to retain water in the glass, so that there can be obtained the property of suitable infrared absorption by the addition of a predetermined amount of water. Further, the property of suitable infrared absorption can be also easily obtained by adding the infrared absorbent.

The composition 6 is suitable for press-shaping and a float-shaping. However, when float-shaping is employed, it is imperative to avoid the addition of any one of $Sb_2O_3$ and $As_2O_3$.

(Composition 7)

The composition 7 is a composition containing 40 to 80% of $SiO_2$, 1 to 10% of $Al_2O_3$, 0 to 20% of $B_2O_3$, 0 to 20% of $R_2O$ ($R_2O=Li_2O+Na_2O+K_2O$) and 0 to 20% of R'O (R'O=MgO+CaO+SrO+BaO). A glass having the above composition is preferably applied to the substrate as an amorphous glass. A substrate made of the above composition can be efficiently improved in strength by chemical strengthening, so that the composition has excellent properties as a substrate to be chemically strengthened and a chemically strengthened substrate.

(Composition 8)

The composition 8 is a glass (crystallized glass) obtained by crystallizing a matrix glass under heat treatment, and the crystallized glass is used as a substrate. The above crystallized glass is a product in which a crystal phase containing enstatite and/or enstatite solid solution is precipitated by heat treatment of a matrix glass. Enstatite is a crystal species composed of Si, Mg and O, and the matrix glass contains $SiO_2$, MgO and $Al_2O_3$ as essential components.

Preferably, the composition 8 contains none of $Li_2O$ and ZnO. Further, preferably, the composition 8 contains, as a crystal phase, none of a crystal phase of a spinel structure and a lithium disilicate crystal.

Enstatite and its solid solution have a structure in which strongly bonding Si and O combinations are connected in the form of a chain and such connected combinations connected through Mg stretch in the form of a plane. Crystal grains are therefore strongly bonded to an amorphous phase. In contrast, a lithium disilicate crystal has the form of a sphere or a form whose major and miner diameters differ to a small extent, and the strength of bonding thereof to an amorphous phase is relatively small. It has an effect on easiness in dissociation of crystal grains on the substrate surface whether the bonding strength of crystal grains and an amorphous phase is large or small. When the substrate is rapidly heated, crystal grains present in the substrate surface come to be easily dissociated due to a difference between the thermal expansion coefficient of a crystal phase and the counterpart of an amorphous layer. According to the above crystallized glass, however, the dissociation of crystal grains is prevented, and the occurrence of concave-shaped defects in the substrate surface can be prevented. In the crystallized glass which has a crystal phase containing enstatite and/or solid solution thereof, the thermal expansion coefficient of the crystal phase and the thermal expansion coefficient of the amorphous phase are close to each other, so that the power to dissociate crystal grains do not easily work. In contrast, in a crystallized glass containing a lithium disilicate crystal phase, the thermal expansion coefficient of the crystal phase and the thermal expansion coefficient of the amorphous phase differ in a manner that one is two or three times as large as the other, so that the power to dissociate crystal grains increases.

For shaping the matrix glass of the composition 8, press-shaping is suitable. The heat treatment for the crystallization is preferably carried out after the press-shaping.

(Composition 9)

The composition 9 is a glass (crystallized glass) that is obtained by crystallizing a matrix glass under heat treatment and is applied to a substrate. The matrix glass has a composition containing, by mol %, 35 to 65% of $SiO_2$, more than 5% but not more than 20% of $Al_2O_3$, 10 to 40% of MgO and 5 to 15% of $TiO_2$, the total content of the above components being at least 92%.

Preferably, the composition 9 contains none of Li$_2$O and ZnO. Further, preferably, the composition 9 contains, as a crystal phase, none of a crystal phase of a spinel structure and a lithium disilicate crystal.

When heat-treated, the above matrix glass gives a crystallized glass containing a crystal phase composed of enstatite and/or an enstatite solid solution. Like the composition 7, therefore, the above crystallized glass can serve to prevent the dissociation of crystal grains and to prevent the occurrence of concave-shaped defects in the substrate surface.

For shaping the matrix glass of the composition 9, press-shaping is suitable. The heat treatment for the crystallization is preferably carried out after the press-shaping.

In the composition 8 or the composition 9, the size of the crystal grains is preferably 100 nm or less, more preferably 50 nm or less. Still more preferably, the crystal grains have a size in the range of 1 to 50 nm.

<Information Recording Medium and Process for Producing the Same>

The information recording medium of the present invention will be explained below. The information recording medium of the present invention comprises a multi-layered film including an information recording layer formed on the above substrate for an information recording medium. According to a recording mode, the information recording medium is largely classified into a magnetic recording medium, a magneto-optical recording medium, an optical disk, and the like. The information recording medium is particularly suitable for a magnetic recording medium. The information recording medium will be explained in detail on the basis of a magnetic recording medium as an example.

In the multi-layered film including an information recording layer (magnetic recording layer) formed on the main surface of the above substrate, the layers forming the multi-layered film include, for example, an undercoat layer, a protective layer, a lubricant layer, etc., in addition of the magnetic recording layer. Such layers have compositions and layer constitutions depending upon intended specifications. The magnetic recording layer is formed of a magnetic layer or formed of a magnetic layer and a non-magnetic layer. An alloy containing Co as a main component is preferred for the magnetic layer. While the material for the undercoat layer is selected depending upon the magnetic layer, it is preferred to use an alloy containing Cr (e.g., alloy containing CrW, alloy containing CrMo or alloy containing CrV) when the magnetic layer is formed of a Co alloy. The protective layer includes a carbon protective film. The lubricant layer includes a layer formed by diluting perfluoropolyether with a Freon-containing solvent, or the like and applying such a diluted solution. The above undercoat layer, magnetic layer, non-magnetic layer and protective layer are preferably formed by sputtering. The above layer constitution is suitable for a longitudinal magnetic recording medium.

For a longitudinal magnetic recording medium, preferably, the substrate is heated before the step of forming the layers.

In a perpendicular magnetic recording medium, for example, a seed layer, a soft magnetic layer, a non-magnetic layer, a magnetic layer (magnetic recording layer), a protective layer and a lubricant layer are formed on a substrate. The hating by irradiation with infrared ray is preferably carried out after the formation of a soft magnetic layer but before the formation of a non-magnetic layer, or carried out after the formation of a magnetic layer but before the formation of a protective layer.

The above heating improves magnetic recording properties, and the magnetization anisotropy of a soft magnetic layer can be aligned. A magnetic field may be applied during the heating of the substrate.

The seed layer includes a Ti alloy layer and a Cr alloy layer. The soft magnetic layer includes an FeTaC layer, an FeCoB layer, a CoTaZr layer, a CoNbZr layer, an NiFe layer and an FeAlSi layer. The non-magnetic layer includes a Ti alloy layer and an NiTaZr layer. The magnetic layer includes a Co alloy layer, and the protective layer includes a carbon layer. The lubricant layer includes the same layer as that explained above.

In recent years, the multi-layered structure comprising a magnetic recording layer tends to increase in the number of layers for improving magnetic characteristics and electromagnetic conversion characteristics, and some magnetic recording media have eight or more layers formed by sputtering. A stationary and opposed sputtering method uses a sputtering apparatus having a plurality of chambers that are connected in series and can be collectively brought into a vacuum state. A sputtering gas such as argon gas can be introduced to each chamber as required. A substrate is introduced into the apparatus and heated in the chamber forming the first zone. Then, the substrate is transferred along the chambers toward the last zone, and layers formed by sputtering are consecutively stacked in the chambers to form a multi-layered film structure. One of the chambers forming latter half zones may be provided with heating means for heating the substrate of which the temperature has decreased. For improving productivity and avoiding any further increase in the scale of the apparatus, desirably, the substrate is heated in the chamber forming the first zone, and the formation of layers by sputtering is completed while the substrate has temperatures suitable for forming the layers. However, with an increase in the number of layers to be stacked, it is difficult to maintain the substrate temperature in a proper range to the end. An information recording layer having sufficient coercive force can be formed only when the substrate has a sufficient temperature. When the formation of layer(s) formable without heating is followed by the heating of the substrate and the formation of an information recording layer, the substrate may be transferred along film-forming chamber(s), a heating chamber and film-forming chamber(s) in the above order to produce an information recording medium.

In an in-line sputtering method, a substrate is transferred from a heating zone and transferred along film-forming zones, layers are consecutively stacked by sputtering to form a multi-layered film (layer(s) formable without heating may be formed before the substrate is transferred into the heating zone). There is therefore caused the same problem that the stationary and opposed sputtering method has.

According to the process for producing an information recording medium, provided by the present invention, the above problem can be overcome. The process for producing an information recording medium, provided by the present invention, includes four embodiments, i.e., processes 1 to 4.

The process 1 is a process for producing an information recording medium by forming a multi-layered film including an information recording layer on a substrate for an information recording medium, the process comprising transferring said substrate heated at an average heating rate of at least 10° C./second, preferably at least 15° C./second, more preferably at least 20° C./second, still more preferably at least 30° C. in a heating zone, along consecutive film-forming zones, and consecutively forming layers for constituting said multi-layered film in the film-forming zones to form the multi-layered film. The above multi-layered film may be a film formed of an information recording layer or may be a film formed of an information recording layer and other layers. The throughput of information recording media can be improved since the time period required for the heating can be decreased. In the above process, a large quantity of information recording media can be mass-produced in one production line, and by increasing the heating rate of substrates, a larger quantity of information recording media can be produced by taking a shorter period of time. As a result, the production cost can be remarkably decreased, and higher-performance products can be provided at a lower cost.

The above process 1 is preferably a process in which the residence time period in the heating zone and the residence time period in each film-forming zone are equal to each other. Further, preferably, the transfer of a substrate into the heating zone and transfer of a substrate out of each film-forming zone are synchronously carried out. In the above production process, the residence time period of a substrate in the heating zone (heating chamber) and the residence time period of a substrate in each film-forming zone (each sputtering chamber) increase or decrease in a linking manner. The total of residence time periods in the film-forming zones, that is, a time period obtained by multiplying the residence time period in each film-forming zone by the number of layers to be formed by sputtering represents accumulated time periods required for forming layers by the sputtering. As the above accumulated time periods increase, the substrate temperature decreases, so that the substrate temperature may more possibly decrease to be lower than a proper temperature for forming layers by sputtering. For decreasing the above accumulated time periods without decreasing the number of layers to be formed by sputtering, it is required to decrease the residence time period in each film-forming zone. For this purpose, the residence time period in the heating zone is also decreased. In the above production process, the average heating rate for the substrate in the heating zone is 10° C./second or more, so that the substrate can be heated up to a desired temperature for a short period of time, and that layers can be formed by sputtering at temperatures in a proper substrate temperature range. In the production of a magnetic recording medium having a multi-layered film having more layers or in the production of a magnetic recording medium that requires the formation of layer(s) at a higher temperature, a heating zone may be provided in a chamber between the first and last chambers in addition to the heating zone in the first chamber. Heating by irradiation with infrared ray is suitable as a method of heating the substrate. When the irradiation with infrared ray is carried out during the step of forming layer(s), the layer(s) reflects infrared ray, so that the power of the infrared ray to be absorbed into the substrate decreases. It is therefore preferred to carry out the heating by irradiation with infrared ray before the initiation of the formation of the layers, and it is more preferred to carry out the above hating immediately before the initiation of the formation of the layers. Such a heating method is particularly preferred for producing a longitudinal magnetic recording medium. Further, there may be employed a constitution in which a layer formable without heating is formed on a substrate, the substrate is heated in the heating zone, and then, the multi-layered film including an information recording layer is formed. In this case, when the heating by irradiation with infrared ray is carried out, the infrared ray is partially reflected by a layer formed before the heating. However, when any one of the substrates 1 to 5 is used, a sufficient heating effect can be produced. The above method is suitable for producing a perpendicular magnetic recording medium.

The heating rate of the substrate is improved as described above, and the time period for forming layers is therefore also decreases, so that the layer can be formed while the substrate comes to have a sufficiently high temperature. Further, since the total production time period can be remarkably decreased, so that the output is improved and that the production cost can be decreased. High-performance products can be therefore stably provided to markets. The above tendency comes to be conspicuous as the number of layers constituting the multi-layered film increases. In the process 1, preferably, the substrate is heated by irradiation with infrared ray.

The process 2 is a process comprising irradiating the above substrate for an information recording medium (any one of the substrates 1 to 5), provided by the present invention, with infrared ray to heat the substrate, and forming a multi-layered film including an information recording layer on the substrate.

In the process 2, a substrate having high infrared absorption efficiency is used, and the substrate is heated by irradiation with infrared ray, so that a high heating rate to the substrate can be attained. For the above heating by irradiation with infrared ray, an infrared ray source having a maximum wavelength of radiation spectrum in a wavelength region of 2,750 to 3,700 is suitable. A heater is suitable as the above infrared ray source when the above heater can be considered a blackbody, the temperature of the heater is preferably adjusted to 600 K to 1,000 K, more preferably to 700 K to 900 K, for matching the maximum wavelength of radiation spectrum to the vicinity of absorption peak of the substrate.

The heater is suitably a carbon heater. When the heater is arranged in a heating chamber, the partial pressure of oxygen in the heating atmosphere is decreased, so that the deterioration of the carbon heater by oxidation can be decreased.

Preferably, the heating by irradiation with infrared ray is carried out before the initiation of formation of layers (before the formation of layers that require the heating), and more preferably, the above heating is carried out immediately before the initiation of formation of the layers, for the same reasons described with regard to the process 1. The above processes may be combined.

The process 3 is a process for producing an information recording medium, comprising forming an information recording layer on a substrate for an information recording medium (any one of the substrates 1 to 5), provided by the present invention, and then heating the substrate by irradiation with infrared ray. A substrate having an information recording layer formed thereon is irradiated with infrared ray, the infrared ray is partially reflected by the information recording layer, and the power of the infrared ray to reach the substrate decreases. Since, however, the above substrates are used, infrared ray that reaches the substrate is absorbed into the substrate, whereby the effect of heating the substrate can be fully obtained.

The process 4 is a process for producing an information recording medium, comprising forming an information recording layer on a substrate for an information recording medium, which substrate is made of a glass or crystallized glass containing an infrared absorbent that is an oxide of at least one metal selected from iron, copper, cobalt, ytterbium, manganese, neodymium, praseodymium, niobium, cerium, vanadium, chromium, nickel, molybdenum, holmium or erbium, and heating the substrate by irradiation with infrared ray.

The processes 3 and 4 are suitable for producing a perpendicular magnetic recording medium. By the above heating by irradiation with infrared ray, the magnetic recording characteristics can be improved, and the magnetization anisotropy of a soft magnetic layer can be aligned. After the heating, for example, a protective layer, etc., may be formed by sputtering.

In the processes 3 and 4, preferably, a plurality of film-forming zones for forming layers constituting the multi-layered film including an information recording layer and a heating zone for heating the substrate are provided, and the substrate is transferred through the consecutive zones to form the multi-layered film. In this case, the heating zone is provided in a position located after the film-forming zone for forming an information recording layer. In these processes, it is preferred to arrange that the residence time period in the heating zone and the residence time period in each film-forming zone are equal to each other. In these processes, the heating efficiency is improved, whereby the heating for a short period of time can produce a sufficient heating effect, so that the heating time period can be decreased, and that the time period that the entire step requires can be remarkably decreased. As a result, the throughput is improved, and there can be provided a large quantity of high-quality information recording media at a low cost. In the processes 3 and 4, it is also preferred to use the same heating source as that described in the process 2.

In any one of the processes 1 to 4, desirably, the average heating rate is 200° C./second or less by taking account of the breakage of a substrate caused by rapid heating. Further, in each process, the residence time period in each of the heating zone and the film-forming zones is preferably 2 to 10 seconds.

It is desirable to decrease the heating time period and the film-forming time period, for decreasing the adherence of foreign matter to the substrate surface and the prevention of formation of coarser crystal grains of a magnetic layer.

In any of the processes 1 to 4, it is preferred to use a stationary and opposed sputtering apparatus, and it is more preferred to use a single-substrate-feed stationary and opposed sputtering apparatus.

In any process, it is preferred to transfer the substrate from one chamber to another chamber in 2 seconds or less.

The process for producing an information recording medium, provided by the present invention, is suitable when the total of the layer-forming time periods is 24 to 300 seconds.

According to any one of the above production processes, the information recording layer can be provided with sufficient coercive force, for example, a coercive force of 3,600 oersted or more, preferably a coercive force of 4,500 oersted or more.

EXAMPLES

The present invention will be explained further in detail with reference to Examples hereinafter, while the present invention shall not be limited by these Examples.

Measurements of glass for a glass transition temperature and spectral transmittance and identification of crystal species of crystallized glass were conducted according to the following methods.

(1) Glass Transition Temperature

A 5φ×20 mm sample was measured at a temperature elevation rate of +4° C./minute with a thermo-mechanical analyzer (TMA8140) supplied by Rigakusha. $SiO_2$ was used as a standard sample.

(2) Spectral Transmittance

A sample machined to have a plain form was measured with spectrophotometers (measured for a transmittance in a wavelength region of 2,200 nm to 6,000 nm with FTIR-8400 supplied by Shimadzu Corporation and measured for a transmittance in a wavelength region of 200 to 2,500 with V-570 supplied by Nippon Bunko). The spectral transmittance includes a loss caused by surface reflection.

(3) Identification of Crystal Species of Crystallized Glass

A powdered crystallized glass was measured for X-ray diffraction with Kα ray of Cu (apparatus: X-ray diffraction apparatus MXP18A, supplied by Mac Science, tube voltage: 50 kV, tube current: 300 mA, scanning angle 10-90°). A precipitated crystal was identified on the basis of an obtained X-ray diffraction peak.

Further, chemical strengthening was carried out by a method described below.

Examples 1-12

Glass raw materials such as $SiO_2$, $Al_2O_3$, $Al(OH)_3$, etc., were formulated so as to have a composition having contents by mol % shown in Tables 1 and 2 and fully mixed, and then the formulated material was placed in a heat-melting vessel and melted at a temperature of 1,000° C. or higher in air. The resultant molten glass was fully de-foamed and stirred to bring the glass into a bubbles-free state. Then, the glass was cast into a mold and gradually cooled to temperature around its glass transition temperature. Immediately thereafter, the glass was placed in an annealing furnace, held for 1 hour and allowed to cool in the furnace to room temperature. The thus-obtained glass has excellent homogeneity, and none of bubbles and non-melted matter was observed.

Glasses in Examples 1 to 9 were machined into flat plates having a thickness of 2 mm each, and both surfaces thereof were optically polished.

Glasses in Examples 10 to 12 were heat-treated around 800° C., to precipitate a crystal seed in each glass, and then the glasses were temperature-increased to a temperature around 1,000° C. to carry out crystallization, to precipitate a crystal phase containing enstatite, whereby crystallized glasses were obtained. The crystallized glasses in Examples 10 to 12 had a crystal grain size of 50 nm or less when observed through a transmission electron microscope. These crystallized glasses were also machined to flat plates having a thickness of 2 mm each and both surfaces thereof were optically polished.

Each sample machined in the form of a flat plate was measured for spectral transmittance, to determine maximum and minimum values of transmittance at a wavelength of 2,750 to 3,700 nm and a spectral transmittance at a wavelength of 1,000 nm. Tables 1 and 2 show these values together with glass transition temperatures. In Examples 1, 2, 4, 5, 7, 8, 10 and 11, iron oxide in an amount (as $Fe_2O_3$) shown in Tables 1 and 2 was incorporated. A water content in each glass was obtained by a calculation from the OH amount of charged materials.

TABLE 1

| | | Example | | | | | |
|---|---|---|---|---|---|---|---|
| | | 1 | 2 | 3 | 4 | 5 | 6 |
| Basic composition (mol %) | $SiO_2$ | 65.5 | 65.5 | 65.5 | 57.0 | 57.0 | 57.0 |
| | $Al_2O_3$ | 8.6 | 8.6 | 8.6 | 5.0 | 5.0 | 5.0 |
| | $Li_2O$ | 12.5 | 12.5 | 12.5 | 14.0 | 14.0 | 14.0 |
| | $Na_2O$ | 10.4 | 10.4 | 10.4 | 2.0 | 2.0 | 2.0 |
| | $K_2O$ | 0.0 | 0.0 | 0.0 | 0.0 | 0.0 | 0.0 |
| | MgO | 0.0 | 0.0 | 0.0 | 6.0 | 6.0 | 6.0 |
| | CaO | 0.0 | 0.0 | 0.0 | 10.0 | 10.0 | 10.0 |
| | BaO | 0.0 | 0.0 | 0.0 | 0.0 | 0.0 | 0.0 |
| | $ZrO_2$ | 3.0 | 3.0 | 3.0 | 5.0 | 5.0 | 5.0 |
| | $TiO_2$ | 0.0 | 0.0 | 0.0 | 1.0 | 1.0 | 1.0 |
| | $Y_2O_3$ | 0.0 | 0.0 | 0.0 | 0.0 | 0.0 | 0.0 |
| Water content (ppm) | | 80 | 200 | 300 | 60 | 200 | 300 |
| $Fe_2O_3$ (ppm) | | 5000 | 1000 | 0 | 5000 | 1000 | 0 |
| Minimum spectral transmittance (%) at wavelength of 2,750-3,700 nm (*) | | 50 | 30 | 18 | 50 | 29 | 19 |
| Maximum spectral transmittance (%) at wavelength of 2,750-3,700 nm (*) | | 68 | 60 | 50 | 65 | 58 | 46 |
| Spectral transmittance (%) at wavelength of 1,000 nm (*) | | 76 | 89 | 92 | 75 | 88 | 91 |
| Glass transition temperature (° C.) | | | 500 | | | 556 | |
| Crystal species | | | None | | | None | |
| Chemically strengthened or not | | | Yes | | | Yes | |

(*) Each spectral transmittance shows a value obtained from a 2 mm thick sample having both surfaces optically polished.

TABLE 2

| | | Example | | | | | |
|---|---|---|---|---|---|---|---|
| | | 7 | 8 | 9 | 10 | 11 | 12 |
| Basic composition (mol %) | $SiO_2$ | 63.0 | 63.0 | 63.0 | 46 | 46 | 46 |
| | $Al_2O_3$ | 4.0 | 4.0 | 4.0 | 10.5 | 10.5 | 10.5 |
| | $Li_2O$ | 0.0 | 0.0 | 0.0 | 0.0 | 0.0 | 0.0 |
| | $Na_2O$ | 4.0 | 4.0 | 4.0 | 0.0 | 0.0 | 0.0 |
| | $K_2O$ | 5.0 | 5.0 | 5.0 | 0.5 | 0.5 | 0.5 |
| | MgO | 0.0 | 0.0 | 0.0 | 30.5 | 30.5 | 30.5 |
| | CaO | 13.0 | 13.0 | 13.0 | 0.0 | 0.0 | 0.0 |
| | BaO | 3.0 | 3.0 | 3.0 | 0.0 | 0.0 | 0.0 |
| | $ZrO_2$ | 4.0 | 4.0 | 4.0 | 0.0 | 0.0 | 0.0 |
| | $TiO_2$ | 4.0 | 4.0 | 4.0 | 9.0 | 9.0 | 9.0 |
| | $Y_2O_3$ | 0.0 | 0.0 | 0.0 | 0.5 | 0.5 | 0.5 |
| Water content (ppm) | | 50 | 200 | 300 | 70 | 200 | 300 |
| $Fe_2O_3$ (ppm) | | 5000 | 1000 | 0 | 5000 | 1000 | 0 |
| Minimum spectral transmittance (%) at wavelength of 2,750-3,700 nm (*) | | 51 | 28 | 18 | 39 | 19 | 13 |
| Maximum spectral transmittance (%) at wavelength of 2,750-3,700 nm (*) | | 70 | 61 | 48 | 52 | 44 | 20 |
| Spectral transmittance (%) at wavelength of 1,000 nm (*) | | 74 | 88 | 91 | 55 | 63 | 65 |
| Glass transition temperature (° C.) | | | 756 | | | 730 | |
| Crystal species | | | None | | | enstatite | |
| Chemically strengthened or not | | | Yes | | | No | |

(*) Each spectral transmittance shows a value obtained from a 2 mm thick sample having both surfaces optically polished.

In each sample, the minimum value of spectral transmittance at a wavelength of 2,750 to 3,700 nm was 51% or less, and the maximum value thereof was 70% or less. In Examples 1, 2, 4, 5, 7, 8, 10 and 11 in which iron was introduced, the spectral transmittances at a wavelength of 1,000 nm were less than 90%.

Each of the above molten glasses was respectively allowed to flow out of a feeder and cut to obtain molten glass gobs having a predetermined weight each, and each molten glass gob was respectively fed onto a press-shaping lower mold member maintained in a temperature range at which such a molten glass did not adhere thereto. Then, each gob was pressed with an upper mold member positioned opposite to the lower mold member, to shape the gob in the form of a disk-shaped thin plate. In this case, each glass had large absorption in an infrared region, so that their rates of cooling by radiation were relatively low. In the direct pressing in which each molten glass was press-shaped while they were in a softened state, it was easy to set shaping conditions, since each glass was not easily cooled.

The press-shaped glasses were annealed, and then, a hole was made in the center of each glass, followed by the machining of their inner and outer side surfaces, the polishing of both surfaces of each glass and the lapping of such surfaces, to obtain disks having the form of a magnetic disk substrate having an outer diameter of 65.0 mm, a thickness of 0.635 mm and a center hole diameter of 20.0 mm each. Further, the disks in Examples 10 to 12 were further crystallized in addition to the above machining steps.

The disks made of glasses in Examples 1 to 9 were immersed in a molten salt to chemically strengthen them. In Examples 1 to 6, the disks were immersed in a molten salt (380° C.) containing sodium nitrate and potassium nitrate for 4 hours, and in Examples 7 to 9, the disks were immersed in a molten salt (420° C.) of potassium nitrate for 4 hours.

Example 13

A multi-layered film including a magnetic layer was formed on each of many substrates for magnetic disks, which substrates were made of the glass in each of Examples 1 to 6 or the crystallized glass in each of Examples 10 to 12, by means of a single-substrate-feed stationary and opposed sputtering apparatus. The single-substrate-feed stationary and opposed sputtering apparatus had a plurality of chambers connected in series and had the function to transfer a substrate from one chamber located in a leading position to another chamber located in a following position. Substrates were synchronously transferred from one chamber to adjacent another chamber one by one. Upon completion of the transfer of the substrates, each substrate resided in each chamber for a constant time period. For the above residence time period, the substrate was heated in the chamber in the first position, a first layer was formed in the chamber in the second position, a second layer was formed in the chamber in the third position, and further, upper layers were formed in the chambers in positions thereafter.

A carbon heater was provided in the chamber in the first position and used as an infrared source at 800 K or higher by electrically powering it. The input to the heater was set at 1 kW. The substrate was heated by allowing the substrate to stand in a position opposed to the heater. Each of the above substrates exhibited large light absorption in the vicinity of wavelength of 3 μm, so that they efficiently absorbed infrared ray radiated from the infrared source and were rapidly heated. In the first chamber that was a heating zone, each substrate was heated at an average heating rate of approximately 30° C./second or more, and they came to have a temperature of 200° C. or higher in a short period of time. The residence time period of the substrates in the chambers was set at 6.4 seconds.

Then, the heated substrate moved to the chamber in the second position and stopped at a position opposed to a sputtering target. Then, an undercoat layer made of a Cr alloy was formed on the substrate by sputtering. In addition, the substrate moved from one chamber to another in one second.

In the chambers including the chamber in the third position and chambers in positions thereafter, a non-magnetic layer and a magnetic layer made of a Co alloy were alternately formed. And, a hydrogenated carbon layer as a protective layer was formed by sputtering, to produce a magnetic disk having a multi-layered film having 8 or more layers. Such magnetic disks were consecutively produced in this manner. A solution of perfluoropolyether in a Freon solvent, or the like was applied to the surface of each of the disks taken out of the sputtering apparatus, and the applied solution was dried to form a lubricant layer on each. Since the substrates were fully in a high-temperature state until all the layers were formed by sputtering, the magnetic disks taken out of the sputtering apparatus had excellent magnetic characteristics and electromagnetic conversion characteristics. For example, the magnetic disks had a sufficient coercive force of 3,600 oersted or more.

The tact time period of the above production process is 7.4 seconds, which is a total of a residence time period of 6.4 seconds in the chamber and a transfer time period of 1 second. In contrast thereto, when glass substrates containing no infrared absorbent and having a water content that does not reach the predetermined amount are used, it is required to take a time period approximately 1.5 times to heat the substrates up to a similar temperature. Even if the substrate are transferred from one chamber to another chamber in 1 second, the tack time is to be approximately 1.5 times as long, which causes a vast output difference in mass-production. In the glasses in Examples 1 and 3, the glass in Example 1 was improved in average heating rate by 12% or more, and the glass in Example 3 was improved in average heating rate by 20% or more, as compared with the case where none of water and iron was incorporated. In the substrates in other Examples, the substrates were also similarly improved in average heating rate.

A multi-layered film was formed on each of the substrates for magnetic disks, which substrates were made of the glasses in Examples 7 to 9, by means of a single-substrate-feed stationary and opposed sputtering apparatus. A seed layer and a soft magnetic layer were formed on each substrate in chambers, each substrate was heated with a carbon heater in a heating chamber, and then a non-magnetic layer and a magnetic layer were consecutively formed in chambers, to produce a perpendicular-magnetic-recording-mode layer constitution. In this case, the residence time period in one chamber was equal to the residence time period in another chamber as well, and the substrates were synchronously transferred from one chamber to another. When the substrates made of the glasses in Examples 7 to 9, the glasses also had high infrared irradiation heating efficiency, so that the substrates were heated to a sufficiently high temperature even without increasing the residence time in the chamber. The thus-produced perpendicular-recording magnetic disks therefore had excellent magnetic characteristics and electromagnetic conversion characteristics. In addition, there may be employed a constitution in which substrates made of the glasses in Examples 7 to 9 are provided, a seed layer, a soft magnetic layer, a non-magnetic layer and a magnetic layer are formed by sputtering, then, each substrate is heated with a carbon heater in a heating chamber to carry out heat treatment, and a protective layer is formed.

While the above Examples used the single-substrate-feed stationary and opposed sputtering apparatus, formation of excellent layers can be performed by means of an in-line type sputtering apparatus.

EFFECT OF THE INVENTION

According to the present invention, there can be provided a substrate for an information recording medium, which substrate has high infrared irradiation heating efficiency, and an information recording medium having the above substrate.

Further, the above substrate can be maintained in a temperature state suitable for forming the multi-layered film, or the substrate having an information recording layer formed thereon can be efficiently heated, so that there can be provided a process for producing an information recording medium. Further, the throughput is remarkably improved, so that there can be provided high-quality information recording media to markets at a low cost.

The invention claimed is:

1. A process for producing a magnetic recording medium by forming a multi-layered film including a magnetic recording layer on a substrate for a magnetic recording medium, the process comprising transferring said substrate heated by irradiation with infrared rays at an average heating rate of at least 10° C./second in a heating zone, along consecutive film-forming zones synchronously into, and out of, the heating zone and each film-forming zone, and consecutively forming layers for constituting said multi-layered film in the film-forming zones to form the multi-layered film
    wherein the substrate for the magnetic recording medium is made of a glass or crystallized glass containing $SiO_2$ and $Al_2O_3$ as essential components, the glass or crystallized glass having a region that has a spectral light transmittance of 50% or less converted in terms of a thickness of 2 mm in a wavelength range of 2,750 nm to 3,700 nm.

2. A process for producing a magnetic recording medium by forming a multi-layered film including a magnetic recording layer on a substrate for a magnetic recording medium, the process comprising transferring said substrate heated by irradiation with infrared rays at an average heating rate of at least 10° C./second in a heating zone, along consecutive film-forming zones synchronously into, and out of, the heating zone and each film-forming zone, and consecutively forming layers for constituting said multi-layered film in the film-forming zones to form the multi-layered film
    wherein the substrate for the magnetic recording medium is made of a glass or crystallized glass containing $SiO_2$ and $Al_2O_3$ as essential components, the glass or crystallized glass showing a spectral light transmittance of 70% or less converted in terms of a thickness of 2 mm over whole wavelength range of 2,750 nm to 3,700 nm.

3. A process for producing a magnetic recording medium by forming a multi-layered film including a magnetic recording layer on a substrate for a magnetic recording medium, the process comprising transferring said substrate heated by irradiation with infrared rays at an average heating rate of at least 10° C./second in a heating zone, along consecutive film-forming zones synchronously into, and out of, the heating zone and each film-forming zone, and consecutively forming layers for constituting said multi-layered film in the film-forming zones to form the multi-layered film
    wherein the substrate for the magnetic recording medium is made of a glass or crystallized glass containing $SiO_2$ and $Al_2O_3$ as essential components, the glass or crystallized glass comprising —OH groups and contains more than 200 ppm of water based upon the total content of water in the glass and —OH groups.

4. The process for producing a magnetic recording medium as recited in any one of claim 1, 2 or 3, wherein the substrate for a magnetic recording medium is transferred to have a residence time period in the heating zone and a residence time period in each film-forming zone, which residence time periods are equal to each other.

* * * * *